United States Patent [19]

Fukino

[11] 4,201,461
[45] May 6, 1980

[54] STOP-DOWN DEVICE IN A BELLOWS DEVICE

[75] Inventor: Kunihiro Fukino, Kawasaki, Japan
[73] Assignee: Nippon Kogaku K.K., Tokyo, Japan
[21] Appl. No.: 23,277
[22] Filed: Mar. 23, 1979
[30] Foreign Application Priority Data
   Mar. 24, 1978 [JP] Japan .............................. 53-37597[U]
[51] Int. Cl.² ......................... G03B 9/06; G03B 17/04
[52] U.S. Cl. ................................... 354/272; 351/158; 354/187; 354/286; 354/288
[58] Field of Search ........ 354/187, 270, 288, 188–194, 354/271–274, 196, 286, 158, 46

[56] References Cited

U.S. PATENT DOCUMENTS

| | | | |
|---|---|---|---|
| 1,362,833 | 12/1920 | Balston | 354/193 |
| 2,695,547 | 11/1954 | Zander | 354/274 X |
| 3,449,042 | 6/1969 | Augrbach | 354/274 X |
| 3,987,472 | 10/1976 | Saito | 354/272 X |

FOREIGN PATENT DOCUMENTS

| | | | |
|---|---|---|---|
| 331214 | 4/1919 | Fed. Rep. of Germany | 354/192 |
| 47-49609 | 12/1972 | Japan | 354/270 |

*Primary Examiner*—L. T. Hix
*Assistant Examiner*—Shelley Wade
*Attorney, Agent, or Firm*—Fitzpatrick, Cella, Harper & Scinto

[57] ABSTRACT

In a stop-down device in a bellows device having a lens mount, operating levers are provided on both the left and right side surfaces of the lens mount so as to ensure that a stop-down knob always assumes the same position even if the lens with the lens mount is mounted in normal direction or in the opposite direction.

3 Claims, 6 Drawing Figures

STOP-DOWN DEVICE IN A BELLOWS DEVICE

BACKGROUND OF THE INVENTION

1. Field of the Invention

This invention relates to a stop-down device in a bellows device mounted between a camera body and a picture-taking lens, which stop-down device is operable so as to stop down the aperture of the lens by engaging the diaphragm blade operating mechanism of the picture-taking lens.

2. Description of the Prior Art

In a bellows device provided with a stop-down device engaging the diaphragm operating mechanism to stop down the aperture of the picture-taking lens and thereby effect metering for determining the exposure, the stop-down device has heretofore been operated by an operating lever provided on one side surface of the lens mount.

However, if the operating lever is so provided only on one side surface (one of the left and right side surfaces) of the lens mount, there occurs the following inconvenience.

Generally, where contact photography is to be effected by the use of a bellows device, the picture-taking lens is usually used due to the performance of the lens in such a proper manner that the lens is mounted in normal direction when the required photographing magnification is less than the 1x magnification and that the lens is mounted in the opposite direction when the required photographing magnification is greater than the 1x magnification and therefore, it is the common practice to remove the lens with the lens mount from the body of the bellows device and again mount the lens on said body in the opposite direction. Where the operating lever is provided only on one of the left and right sides of the lens mount, this will cause that side on which the operating lever exists to be changed in place between left and right each time the lens is mounted with the lens mount in normal direction or in the opposite direction. Further, depending on the condition of the mounting, the direction in which the operating lever for stopping down the lens is operated is also changed. Therefore, the conventional stop-down device in the bellows device has been inconvenient in operability because of the above-described reason.

SUMMARY OF THE INVENTION

It is an object of the present invention to provide a bellows device having a stop-down device whose operability during photography is not affected by the direction in which the picture-taking lens is mounted.

According to the present invention, operating levers are provided on both the left and right side surfaces of the lens mount and it is ensured that the stop-down knob always assumes the same position even if the lens with the lens mount is mounted in normal direction or in the opposite directin, and the direction of operation at that time is not changed at all.

The invention will become more fully apparent from the following detailed description of an embodiment thereof taken in conjunction with the accompanying drawings.

DESCRIPTION OF THE PREFERRED EMBODIMENTS

Figure 1:
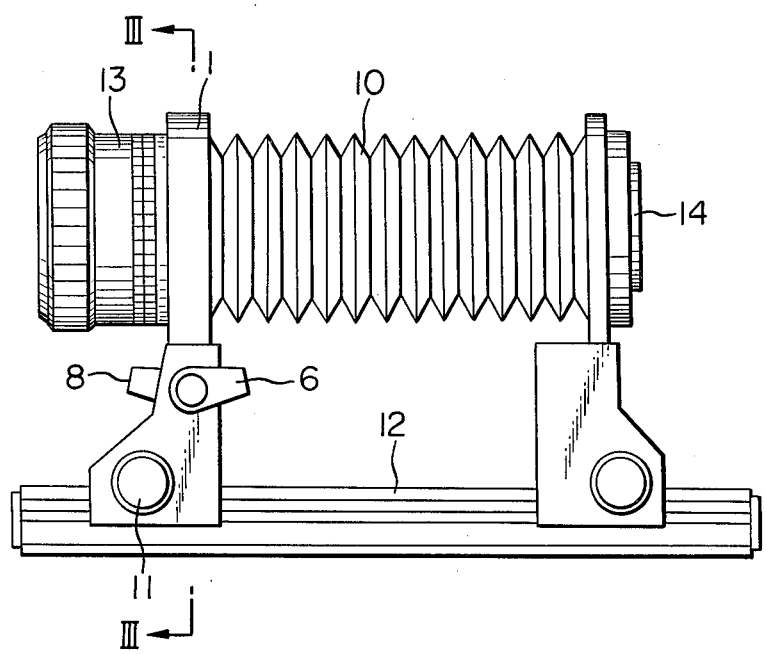
FIG. 1 is a front view showing the device according to an embodiment of the present invention and a picture-taing lens mounted in normal direction.
Figure 2:
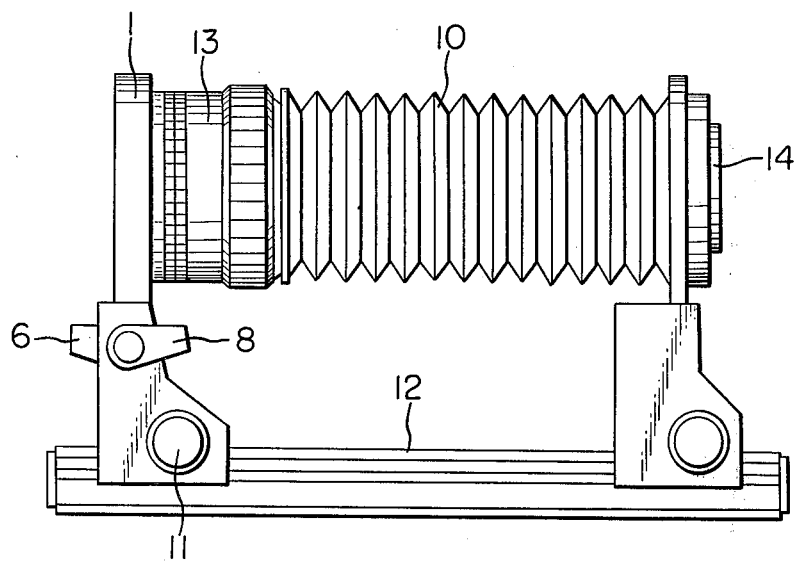
FIG. 2 is a front view showing the picture-taking lens mounted in the opposite direction to the device of FIG. 1.
Figure 3:
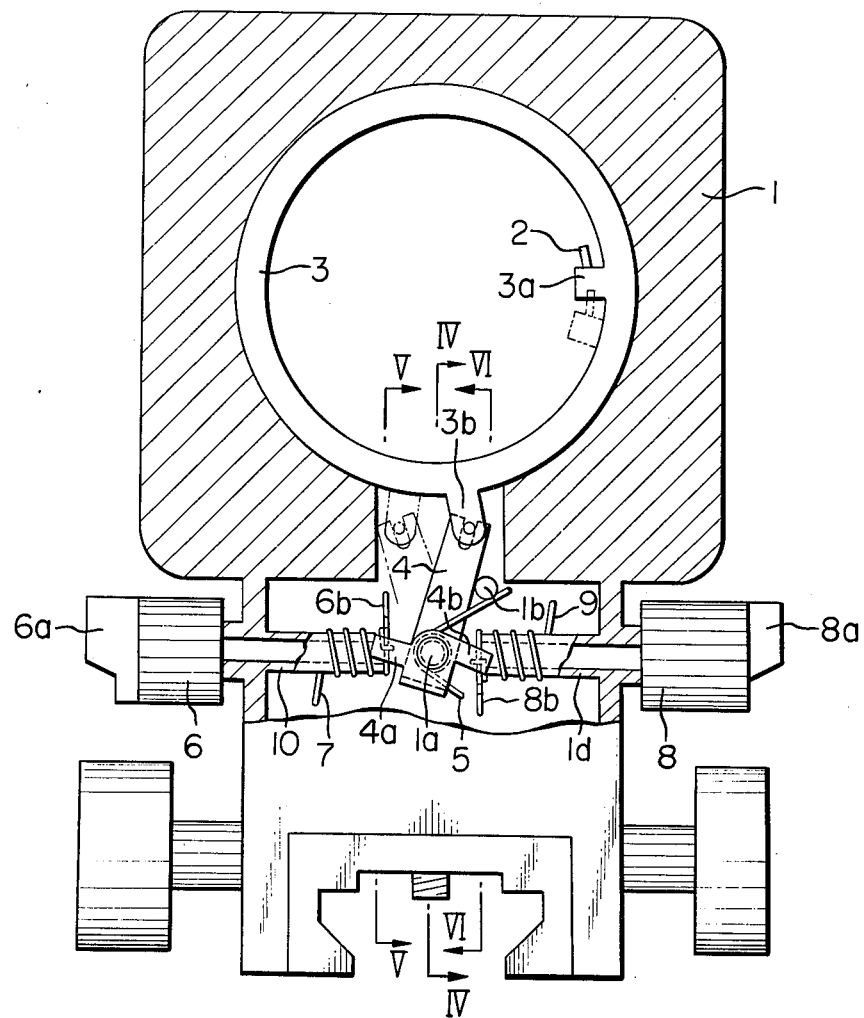
FIG. 3 is a cross-sectional view taken along line III—III in FIG. 1.
Figure 4:
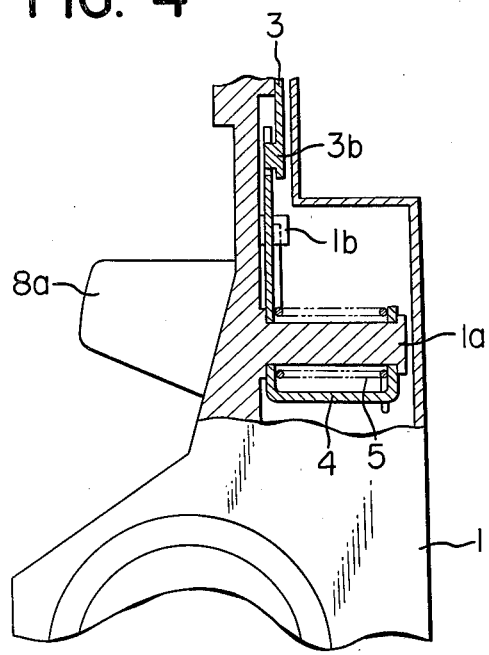
FIG. 4 is a cross-sectional view taken along line IV—IV in FIG. 3.

Referring to FIG. 1, the lens mount 1 of a bellows device is constructed so as to be slidable on a rail 12 by turning a moving knob 11 and a picture-taking lens 13 is mounted in normal direction by a known means. The lens may be mounted to the device in the opposite direction by breaking the coupling between the lens mount 1 and the bellows 10, mounting the lens mount 1 with the picture-taking lens 13 on the rail 12 in the opposite direction, and coupling the fore end of the picture-taking lens to the bellows 10 in the manner as shown in FIG. 2. Designated by 14 is a mount portion for mounting the assembly to the camera body. Denoted by 6 and 8 are stop-down levers for stopping operation which will further be described.

In FIGS. 3 to 6, an aperture lever 2 biased in clockwise direction (stop-down direction) by a spring (not shown) is projected from the picture-taking lens 13 and engaged with the projected portion 3a of an interlocking ring 3 provided for angular rotation for a predetermined angle on the lens mount 1. The interlocking pin 3 is provided with a pin portion 3b. The pin portion 3b is engaged with a rotatable lever 4 provided for angular rotation for a predetermined angle about the rotary shaft portion 1a of the lens mount 1. The rotatable lever 4 is biased clockwisely, as viewed in FIG. 3, by a spring 5 provided around the rotary shaft portion 1a. Thus, with the lens mounted on the lens mount 1, the interlocking ring 3 is always biased counter-clockwisely, as viewed in FIG. 3, from the rotatable lever 4 through the pin portion 3b by the spring 5 and ,moreover, since the biasing force thereof is greater than the clockwise biasing force acting on the aperture lever 2 of the lens, the aperture of the picture-taking lens is open. Designated by 1b is the rotation limiting portion of the rotatable lever 4. On the left-hand side of the lens mount 1 in FIG. 3, a left stop-down lever 6 is provided for angular rotation for a predetermined angle about a bearing portion 1c. The left stop-down lever 6 is provided with an operating portion 6a and an engaging portion 6b operatively associated with the left engaging portion 4a of the rotatable lever 4. The lever 6 is biased counter-clockwisely, as viewed in FIG. 5, by a spring 7 provided around the bearing portion 1c. On the right-hand side of the lens mount 1, as viewed in FIG. 3, a right stop-down lever 8 is provided for angular rotation for a predetermined angle about a bearing portion 1d. The right stop-down lever 8 is provided with an operating portion 8a and an engaging portion 8b operatively associated with the right engaging portion 4b of the rotatable lever 4, and this right stop-down lever 8, like the left stop-down lever 6, is biased counter-clockwisely, as viewed in FIG. 6, by a spring 9 provided around the bearing portion 1d.

Operation will now be described.

Figure 6:
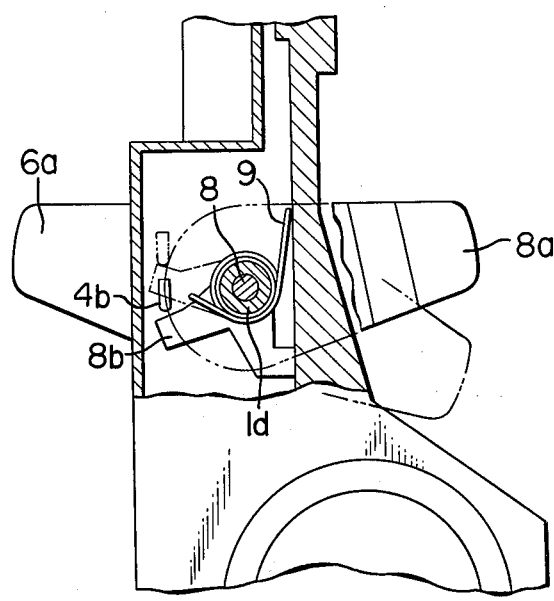
FIG. 6 is a cross-sectional view taken along line VI—VI in FIG. 3.
Figure 5:
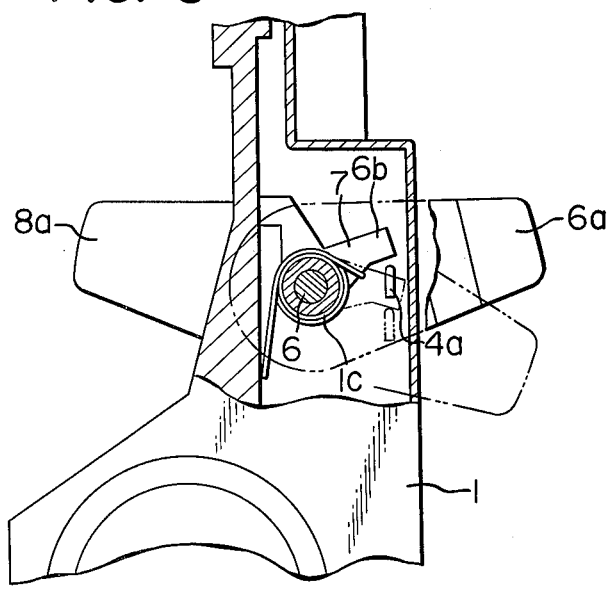
FIG. 5 is a cross-sectional view taken along line V—V in FIG. 3.

This embodiment presupposes that in the actual photography using the bellows device, the right hand effects the fixing of the lens mount and the camera mount and the operation of shutter charge or double cable release while the left hand effects the axial movement of the lens mount and the camera mount, the operation of the distance ring and aperture ring of the lens, and the operation of the stop-down lever during metering. Therefore, the stop-down lever is provided so that it may be easily manipulated by the left hand. First, where the lens is provided in normal direction, the operating portion 6a of the left stop-down lever 6 is operated by the left hand and rotated clockwisely to the position indicated by dots-and-dash line in FIG. 5, whereupon the engaging portion 6b depresses the left engaging portion 4a of the rotatable lever 4 to the position indicated by dots-and-dash line. Thereupon, in FIG. 3, the rotatable lever 4 is rotated counter-clockwisely and such rotational movement is transmitted to the interlocking ring 3 through the pin portion 3b, the result of which is that the interlocking ring 3 is rotated clockwisely to assume its position as indicated by dots-and-dash line. At this time, the aperture lever 2 of the lens engaged with the projected portion 3a follows to rotate in the same direction, whereby the aperture of the lens is stopped down. Next, where the lens is provided in the opposite direction, the lens mount 1 is bodily reversed in the manner as shown in FIG. 2, whereby the right stop-down lever 8 is brought to the left side as viewed from the camera side. In FIG. 6, the operating portion 8a of the right stop-down lever 8 is operated just in the same manner as the left stop-down lever 6 has been operated, and is clockwisely rotated to the position of dots-and-dash line, whereupon the engaging portion 8b is rotated to raise the right engaging portion 4b of the rotatable lever 4 to the position of dots-and-dash line. Thereupon, the same operation occurs as that when the lens is mounted in the normal direction to stop down the aperture of the lens.

The present embodiment is so designed that the stop-down operation is effected by the left hand as stated in the outset of the description of the operation, but when it is desired to design the device so as to be operable by the right hand on the convenience of the construction and arrangement of each operating portion of the bellows device, this may be course be realized by modifying the present embodiment to some extent.

Thus, according to the present invention, stop-down levers are provided on both the left and right side surfaces of the picture-taking lens mount and it is ensured that the stop-down levers always assume the same position even if the lens is made to face in the normal direction or the opposite direction by bodily changing the direction of the lens mount and further, the direction of the operation involved therefor is not at all changed, and this leads to the provision of a bellows device having a stop-down mechanism which enables stopping down of the lens always by one hand and by precisely the same operation.

I claim:

1. In a bellows device having a lens mount formed with a mount portion for mounting thereon a picture-taking lens and installable in normal direction in which the mount portion faces the object side during photography and in the opposite direction in which the mount portion faces the camera side, a stop-down device provided on said lens mount and operable so as to stop down a diaphragm blade by operating the aperture mechanism of said picture-taking lens, said stop-down device comprising:

a diaphragm interlocking member engageable with said aperture mechanism and displaceable between a first position to operate said aperture mechanism so as to open said diaphragm blade and a second position to operate said aperture mechanism so as to stop down said diaphragm blade; and operating means including a first operating member having a first operating portion projecting from one side surface of said lens mount, said first operating member engaging said diaphragm interlocking member so as to displace said diaphragm interlocking member from said first position to said second position by displacement of said first operating portion in one direction, and a second operating member having a second operating portion projected from the other side surface of said lens mount, said second operating member engaging said diaphragm interlocking member so as to displace said diaphragm interlocking member from said first position to said second position discretely from said first operating member by displacement of said second operating portion in the direction opposite to the direction of displacement of said first operating portion.

2. The device according to claim 1, wherein said diaphragm interlocking member includes;

a rotatable member having a first engaging portion engageable with said first operating member and a second engaging portion engageable with said second operating member, said rotatable member being rotatably provided on a fixed shaft; and means for transmitting the rotation of said rotatable member to said aperture mechanism.

3. The device according to claim 2, wherein said first operating member comprises a first rotary shaft secured to said first operating portion and rotatable about an axis orthogonal to the optic axis of said picture-taking lens, said first rotary shaft being engageable with said first engaging portion of said rotatable member during a rotation to one direction, and a second rotary shaft being secured to said second operating portion and rotatable about said axis, said second rotary shaft being engageable with said second engaging portion of said rotatable member during a rotation in the direction opposite to said rotation of said first rotary shaft.

* * * * *